(No Model.)
D. L. HOLDEN.
AMMONIA STILL.
No. 460,137. Patented Sept. 29, 1891.
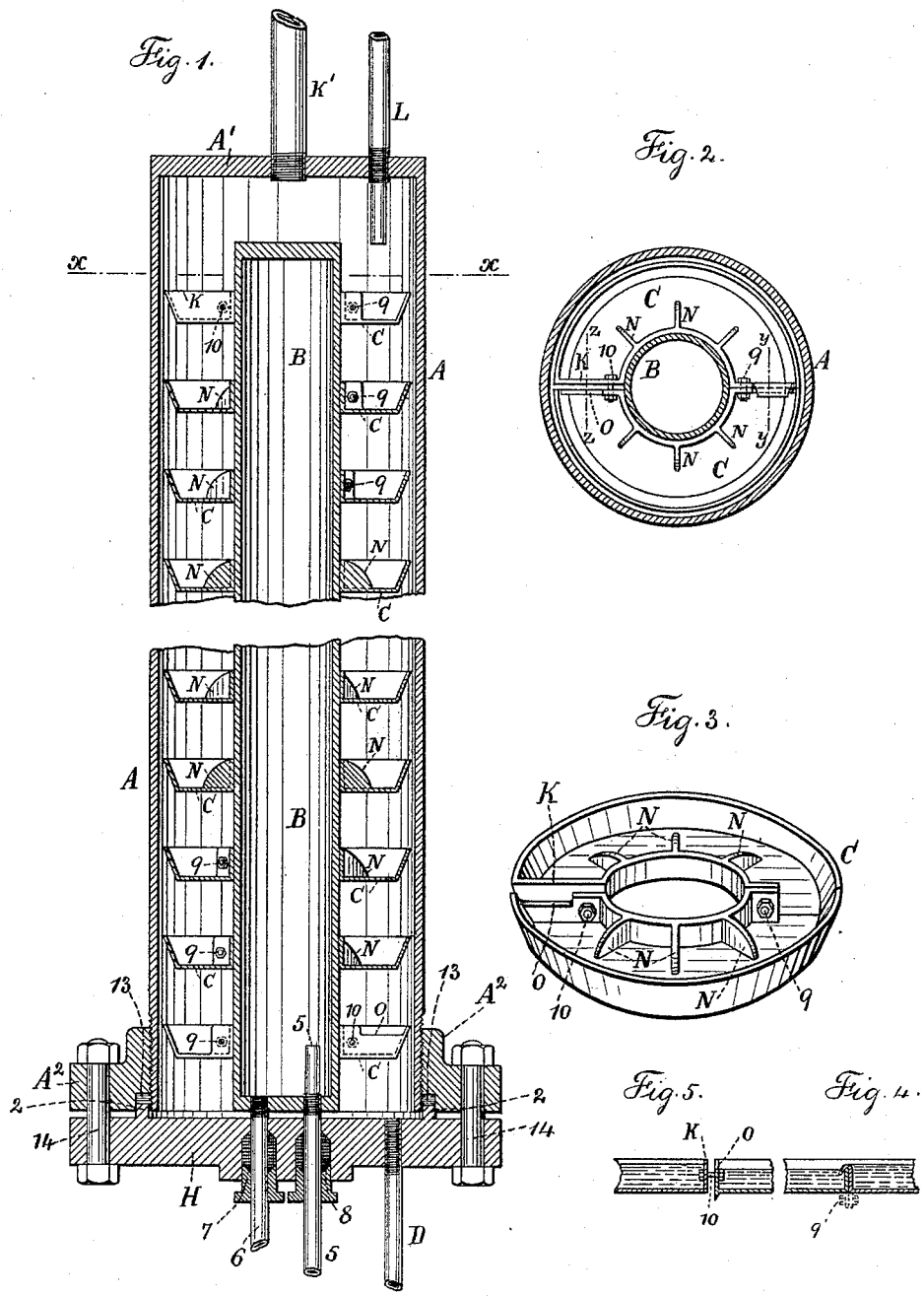
Witnesses:
J. Stait
Chas H. Smith
Inventor:
Daniel L. Holden
per Lemuel W. Serrell
atty.

UNITED STATES PATENT OFFICE.

DANIEL L. HOLDEN, OF NEW YORK, N. Y.

AMMONIA-STILL.

SPECIFICATION forming part of Letters Patent No. 460,137, dated September 29, 1891.

Application filed March 23, 1891. Serial No. 386,002. (No model.)

*To all whom it may concern:*

Be it known that I, DANIEL L. HOLDEN, a citizen of the United States, residing at the city, county, and State of New York, have invented an Improvement in Ammonia-Stills, of which the following is a specification.

Stills for the production of anhydrous gases are exposed to heavy pressure, and the risk of escape of vapors from such stills is very great, and it is necessary to provide for cleaning or repairing such stills from time to time; and the present invention relates to the construction of the still, whereby the risk of leakage is reduced to a minimum and all parts of the still are easy of access and a large extent of surface is obtained in a small compass.

In the drawings, Figure 1 is a vertical section of the still. Fig. 2 is a sectional plan view at the line $x$ $x$, and Fig. 3 is a perspective view, of one of the pans in the still. Fig. 4 is a section at $y$ $y$, Fig. 2; and Fig. 5 is a section at $z$ $z$.

The external case A is made of a steel or similar tube of suitable size, having at the upper end a head A', preferably welded into the same, and at the bottom end of the still a flange $A^2$ is screwed upon the exterior of the tube, and the base of the still is made as a plate H, having an annular rib 2, passing outside the bottom end of the tube A and into a recess in the flange $A^2$ for pressing against packing material introduced into such groove, and there are holes through the flange $A^2$ and base H for clamping-bolts. In consequence of having but the one joint at the bottom end of the tube A there is but little risk of the escape of any vapors, because the liquid can remain in the bottom of the still sufficient to cover up the joint, and the joint can be tightened with facility or the case of the still lifted off from the base when necessary.

In apparatus for refrigerating there is difficulty in preventing the tubular structure becoming misplaced by the pressure and also in allowing the parts to be separated with facility and in tightening the parts with rapidity and reliability.

If the case or tube A was provided with a lead packing 13, pressed into the screw-thread by the clamping action of the bolts 14, the thread might be cut out by the end pressure and the tube A be blown off. By screwing the flange $A^2$ directly upon the exterior of the tube A and allowing the end to pass within the rib 2, the tube will be held firmly in place regardless of the packing, and the packing at 13, of india-rubber, lead, or other material, will only have the duty of closing the joint gas-tight by direct contact with the screw-thread joint and within the annular grooves, and hence the device is very reliable. If the packing was only in contact with the parts H and $A^2$, as heretofore usual, there might be leakage at the screw-thread between A and $A^2$. This is prevented by the packing being in contact with the screw-thread as well as with the parts H and $A^2$.

Within this still is the column B, preferably made of steel, with both ends permanently closed by heads welded into position, and there is a steam-supply tube 5 and a tube 6 for the water of condensation, both screwed into the lower end of the column B, and the surfaces of these tubes should be turned or trued to pass through the glands or stuffing-boxes 7 8, such tubes being permanently screwed into the lower head of the column, and the end of the tube 5 rises sufficiently above the bottom head for the supply-steam not to be interfered with by the water of condensation. This column is used for heating or cooling the still and the ammonia. Around the column B is a range of shallow pans C. Each pan is made of two parts bolted together at 9 10, so as to be clamped firmly to the column. Each half-pan is preferably provided with radial conducting-ribs N, passing out into the liquid, so that the heat will be brought into direct contact with the liquid in such pans, and at the ends of the half-circular pans there are flanges for the bolts 9 and 10, and there is a passage or channel adjacent to the bolt 9, that is either open, as seen in Fig. 3, or preferably in the form of a lip, as seen in Fig. 4, so that the liquid can circulate around through the pan and run over the dam at O down into the pan below. The flange K is the same height as the edge of the pan, or nearly so.

The bottom of the pan C may be flat near the bolt 9, as seen in Fig. 3, in which case a packing of rubber or similar material will be needed at the joint. The bolt 9 may be below the pan, as shown by dotted lines, Fig. 4. These pans are placed upon the column B in such a manner that the dam O on one pan will be above the space adjacent to the flange K on the pan below. Hence the liquid running over the dam in one pan will travel around the pan below and over the dam thereof into the pan next below, and liquid supplied into the still by the pipe L will travel progressively from the top to the bottom of the still through all the pans and be exposed to the heating operation to drive off the anhydrous ammonia, which passes by the pipe K' to the refrigerating apparatus, and the spent liquid runs away by the pipe D to any suitable receptacle. By this construction the volatile ammonia is driven off with reliability and there is but little risk of watery vapors passing off with the ammonia, because the temperature of the still can be maintained at as low and uniform a degree as possible, and there is a great extent of evaporating-surface and the liquid has to travel a great distance between the point of reception and discharge, and the gases which ascend come in contact with the cooler liquid in the upper part of the still and aqueous vapors are condensed.

In large stills there may be two or more columns, each provided with a range of pans securely fastened to the same, so that the heat of the column may be conducted to the pans, and in cases where the still is used in condensing or absorbing the column and pans are cooled to act on the liquids in the pans, water being run through the column in place of steam.

I claim as my invention—

1. The combination, in an ammonia-still, of the case A, permanently closed at the one end and having the base at the other end and packing and clamping devices around such base, a hollow column closed at the ends, a supply-pipe for fluid, and a discharge-pipe connected with the bottom of the column and passing through the base, and packings around such pipes, and a range of pans connected to and supported by the column, substantially as set forth.

2. The annular pans C, each made in two parts, bolts for connecting the same together, and the dam over which the liquid flows from one pan to the next, in combination with the column to which such pans are connected and the surrounding case of the still, substantially as set forth.

3. The combination, with the column B and the case A, of annular pans provided with radial flanges N, and a dam over which the liquid is caused to flow from one pan to the next, substantially as set forth.

4. The hollow column B, permanently closed at its ends, and the tubes 5 and 6, screwed into one end, in combination with the base H, through which such tubes pass, packings around the tubes, the still-case A, permanently closed at its upper end, the flange $A^2$, secured onto the lower end of the case and having an annular groove and packing therein that is directly in contact with the screw-thread and the rib 2 on the base H, and the attaching devices, substantially as set forth.

5. The combination, with the tube A, of the flange $A^2$, screwed directly upon the exterior of the tube, and a packing-ring introduced into an annular recess and in direct contact with the screw on the tube, a rib, and screws to compress the packing, substantially as specified.

Signed by me this 16th day of March, 1891.

DANIEL L. HOLDEN.

Witnesses:
GEO. T. PINCKNEY,
WILLIAM G. MOTT.